(12) United States Patent
Semer

(10) Patent No.: US 12,456,850 B2
(45) Date of Patent: Oct. 28, 2025

(54) ELECTROSTATIC GENERATOR

(71) Applicant: Jerry Semer, Fremont, OH (US)

(72) Inventor: Jerry Semer, Fremont, OH (US)

( * ) Notice: Subject to any disclaimer, the term of this patent is extended or adjusted under 35 U.S.C. 154(b) by 375 days.

(21) Appl. No.: 17/760,511

(22) PCT Filed: Sep. 17, 2020

(86) PCT No.: PCT/US2020/051217
§ 371 (c)(1),
(2) Date: Mar. 15, 2022

(87) PCT Pub. No.: WO2021/055566
PCT Pub. Date: Mar. 25, 2021

(65) Prior Publication Data
US 2022/0278509 A1    Sep. 1, 2022

Related U.S. Application Data

(60) Provisional application No. 62/902,449, filed on Sep. 19, 2019.

(51) Int. Cl.
*H01T 19/00*    (2006.01)
*H01T 23/00*    (2006.01)
*H05F 7/00*    (2006.01)

(52) U.S. Cl.
CPC ............. *H01T 19/00* (2013.01); *H01T 23/00* (2013.01); *H05F 7/00* (2013.01)

(58) Field of Classification Search
None
See application file for complete search history.

(56) References Cited

U.S. PATENT DOCUMENTS

| 685,958 A | 11/1901 | Tesla |
| 1,014,719 A | 1/1912 | Pennock |
| 1,540,998 A | 6/1925 | Plauson |
| 2,633,542 A * | 3/1953 | Coleman ................. G21H 1/02 310/305 |

(Continued)

FOREIGN PATENT DOCUMENTS

| DE | 102019133203 B4 * | 5/2022 | ......... H10H 20/8586 |
| KR | 20110038191 A * | 4/2011 | |

(Continued)

OTHER PUBLICATIONS

Pennock, U.S. Pat. No. 911,260 issued Feb. 2, 1909.

(Continued)

*Primary Examiner* — Andrew Smyth
(74) *Attorney, Agent, or Firm* — Jacob M. Ward; Ward Law Office LLC

(57) ABSTRACT

The generator has three main parts. The first is a charged particle source. The second is a static electric field. The third is a collector connected to the ground or a capacitor. The first species has a wire, the collector, from the ground to the ion source. In the second species, the wire acts as a collector or is attached to the collector. The charged particle source can be any method that can produce ions. The electrostatic field can be the field of the Earth or a static field. The collector is attached to a grounded load. In one design, electrons are drawn through the load by an electron-emitting source attached to the top of the wire. The static electric field causes the rise of the electrons in the wire. In another embodiment, ions from the ion source are accelerated by the static field towards a collector.

25 Claims, 6 Drawing Sheets

(56) References Cited

U.S. PATENT DOCUMENTS

| | | | |
|---|---|---|---|
| 3,816,771 A | 6/1974 | Moir | |
| 3,849,275 A * | 11/1974 | Candor | F26B 5/12 |
| | | | 204/554 |
| 7,439,712 B2 | 10/2008 | Mccowen | |
| 7,855,476 B2 | 12/2010 | Ogram | |
| 8,045,314 B2 | 10/2011 | Ibok | |
| 8,102,082 B2 | 1/2012 | Ogram | |
| 8,686,575 B2 | 4/2014 | Mccowen | |
| 8,693,160 B2 | 4/2014 | Lane | |
| 9,160,156 B2 | 10/2015 | Allen et al. | |
| 9,331,603 B2 | 5/2016 | Mccowen | |
| 9,479,086 B2 | 10/2016 | Mccowen | |
| 2006/0077762 A1* | 4/2006 | Boland | H02N 1/08 |
| | | | 367/170 |
| 2012/0106023 A1 | 5/2012 | Mayer | |
| 2013/0093261 A1* | 4/2013 | Allen | H02G 13/20 |
| | | | 307/149 |
| 2022/0278509 A1 | 9/2022 | Semer | |

FOREIGN PATENT DOCUMENTS

| | | | | |
|---|---|---|---|---|
| KR | 20110086403 A * | 7/2011 | | F24F 8/22 |
| KR | 102220054 B1 * | 2/2021 | | A61L 2/26 |
| KR | 20220047183 A * | 4/2022 | | F26B 3/30 |
| WO | 2018162884 A1 | 9/2018 | | |

OTHER PUBLICATIONS

Written Opinion of the International Searching Authority dated Dec. 3, 2020.

A. Assion, et al."Control of Chemical Reactions by Feedback-Optimized Phase-Shaped Femtosecond Laser Pulses." Science vol. 282 (Issue 5390) pp. 919-922; Oct. 30, 1998.

Regan, William et al., "Screening-Engineered Field-Effect Solar Cells", Nano Lett. 2012, 12, 8, 4300-4304, https://doi.org/10.1021/nl3020022, https://pubs.acs.org/doi/abs/10.1021/nl3020022.

Gilmore, C.P. and Hawkins, William J., Amazing Motor Draws Power From the Air:, Magazine Article, Apr. 1971, pp. 80, 81 and 154, Popular Science, Published by Bonnier Corporation, New York, http://www.rexresearch.com/jefimenko/jefimenko.htm.

Noon, Walt, "Secrets of Building Electrostatic Lightning Generators", Book, 1992, pp. 81-84, Lindsay Publications Inc., Bradley IL.

Written Opinion of the International Searching Authority dated May 8, 2024.

* cited by examiner

ELECTROSTATIC GENERATOR

FIELD OF THE INVENTION

The invention relates to the field of electrostatic generators and, more particularly, to the field of electrostatic generators that use an electrostatic field to move charges.

BACKGROUND OF THE INVENTION

The invention is a method for producing energy from a static field and charged particles. A static field moves charged particles. The invention is comprised of a method of producing charged particles, a static electric field, and a collector that is usually grounded to the Earth.

One embodiment of the invention could be akin to an electric waterfall. Experiments have shown that the Earth is surrounded by an electric field. The Earth's surface and the ionosphere form a large capacitor. In 'fine weather,' the potential, aka 'voltage,' increases with altitude at about 30 volts per foot (100 V/m), when climbing against the gradient of the electric field. This electric field gradient continues up into the atmosphere to a point where the voltage reaches its maximum in the neighborhood of 400,000 volts. This occurs at approximately 30-50 km above the Earth's surface.

Thus, a wire from a tall tower down to the Earth could carry substantial voltage. A tower of a 1000 ft would have a wire whose top was at approximately 30,000 volts and whose bottom attach to the ground would be at 0 volts. The wire would collect charged particles or ion in the air and neutralize them with electrons from the ground. These ions are created by cosmic rays and the decay of radioactive elements in the Earth. However, due to only a small number of ions in the air, this wire would not carry substantial wattages.

The applicant proposes several methods to use this wire's voltage. The first method is to attach to the wire a substance that gives off electrons. This could be a substance such as cesium, rubidium, and antimony, that undergoes the photoelectric effect when sunlight hits its surface. When an electron is knocked away from the substance, another electron coming from the ground will take its place. The electron will be driven from the ground to the substance by the voltage increase caused by the Earth's electric field. The electron given off by the substance could also be collected to produce more energy.

Another method would be to attach the wire to a radioactive substance. When a substance decays, giving off beta particles, the substance will become charged. That charge would cause electrons from the Earth to flow up the wire to the higher voltage. Any method that emits electrons, such as thermionic emissions, could be used. The emitted electron would charge on the material and pull up electrons from the ground.

Another method would be to use the radioactive substance to create ion pairs near the upper end of the wire and thus substantially raising the wattages carried by the wire. This could be done just like nature creating ion by radioactive decay. By placing a radioactive element that gives off ionizing radiation near the tip of the wire, a large number of ions could be created, and the wire could carry substantial wattage.

Besides radioactivity, there are several possible ion sources which could be used to create ions near the wire tip. Corona discharge, plasma, charging with a vapor, flame, cold cathode emissions, thermionic emissions, photoemission, electron impact ionization, electrospray, strong external electric field emission, fast atom bombardment, electrospray ionization, atmospheric pressure chemical ionization, matrix-assisted laser desorption ionization, etc. are common methods to produce ions. Thus, a source near the top of the wire could increase the number of ions. Charging a vapor near the top of the wire could also increase the number of ions. The energy is due to the difference between the charge on the Earth's surface and the ionosphere and the fact that the Earth is a sink.

You do not need to use only the static electric field created by the Earth. Any static electric field will work. The easiest would be to use a charged plate or an electret place above the ground. The charged plate or an electret would be one electrode of a capacitor and the Earth would be the other. A wire extends upward from the Earth toward the plate or electret. The wire will collect charged particles or ions in the air and neutralize them with charges from the ground. As in the previous example, there are numerous ways to create ions. In the previous system, electrons would only flow up the wire due to the direction of the electric field. However, since the ground can both produce electrons and accept electrons, the plate or electret can be either charge. The maximum voltage flow in the wire would be equal to the field near the tip of the wire.

The electric fields can be used to produce energy in other ways. One way would be to place a positive ion source above the Earth. The ions would be attracted towards the Earth and could be collected by a plate. The positive ion would be able to build upon the electrode to the point where the voltage of the electrodes would be nearly equal to the Earth's electric field near the ion source. Another way which would be far more practical would be to use an electret of the charged plate. An ion source would be placed next to the electret or plate. The electric field of electret would accelerate the ions towards an electrode that would capture them. The ions would be able to build upon the electrode to the point where the voltage of the electrode would be nearly equal to the voltage of the electret. At some specific voltage, the voltage on the electrode would be allowed to flow through a load and then to the earth ground. As in the previous example, there are many ion sources.

A third way to produce power is to use the electric field between two charged plates or electrets. An electron source accelerated the electron to a velocity. The electrons move forward at the given velocity into an electric field formed by two plates or electret. The electrons are accelerated downward or upward according to the charge upon the plates or electret. A collector collects the deflected electrons. The velocity of the electrons will be the forward velocity pulse the downward or upward velocity created by the electric field by the two plates or electret. The addition of these two velocities is shown in the vector diagram 22 of FIG. 16. This velocity will be higher than the velocity of the electron initially expelled by the electron source. The electrons collected by the collector than flow through a load connected to the ground.

SUMMARY OF THE INVENTION

The invention has three main parts. The first is a charged particle source. The second is a static electric field. The third is a collector connected to the ground or a capacitor to complete the circuit. The first species has a wire as the collector from the ground to the ion source. In the second species, the wire acts as a collector or is attached to the collector. Ion source can be any method that can produce ions. The electrostatic field can be the field of the Earth or a static field. The collector is attached to a grounded load. In one design, electrons are drawn through the load by an electron emitting source attached to the top of the wire. The static electric field causes the rise of the electrons in the wire. Another design has an ion source placed near the top of the wire and uses the electric field of the Earth or a static field created by an electret and/or plate. The static electric field causes the electron to rise or fall in the wire and move through the grounded load when the ions from the source make contact with the wire.

In another embodiment, ions from the ion source are accelerated by the static field of the Earth or a static field created by an electret and/or charged plates. The accelerated ions are collected by a collector or electrode. The collector or electrode is attached to a grounded load. The ions accelerated by the static field against the electric field of the collector or electrode do work, which raises their voltage. The collector or electrode accumulates the ions with a higher voltage and directs them through the ground load. In a variation of this design, the ion source emits ions towards a set of charged plates or electret. When the ions get between the charge plates or electrets, they are accelerated upward or downward according to the charges on the plates and the ions. The ions after being accelerated by the plates or electrets are collected. The total energy of the ions will be the energy given to the ions by being emitted from the ion source and the energy supplied by the charged plates or electrets.

DETAILED DESCRIPTION OF THE DRAWINGS

DETAILED DESCRIPTION OF THE PREFERRED EMBODIMENT

Figure 1:
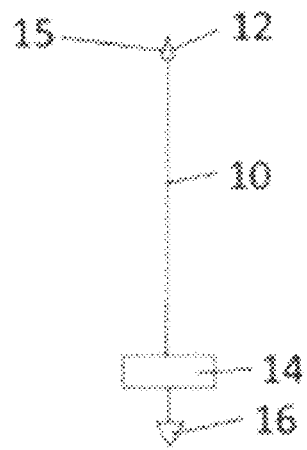
FIG. 1 is a diagram of one embodiment of the invention.

FIG. 1 shows one embodiment of the invention. FIG. 1 shows a wire 10 that extends high above the Earth. In the preferred embodiment, this wire would extend over 300 feet above the Earth. Attach to the end above the Earth of the wire 10 is a source emitting electrons 12. This source could produce electrons or negative ions by radioactive, thermionic emissions, photoemission, etc. In the preferred embodiment, the source emitting electron 12 is a radioactive source 15 giving off beta particles. The wires 10 are attached to a collector load 14. The collector load 14 is attached to the ground 16.

An electric field surrounds the Earth. The Earth's surface and the ionosphere form a large capacitor. In "fine weather," the potential, aka 'voltage,' increases with altitude at about 30 volts per foot (100 V/m) when climbing against the gradient of the electric field. Thus, a wire whose end was at 300 feet would have an electric field of 9000 volts surrounding that end. The other end of the wire is attached to the ground, which would have an electric field of 0 volts. When the source emitting electron 12 emits an electron, it becomes more positive, drawing up an electron from the ground. This electron is drawn up with the force of the difference of the voltage at the top of the wire and the bottom of the wire. In the example, the electron would be drawn with a force of 9000 volts. The electron given off could also be collected.

Figure 2:
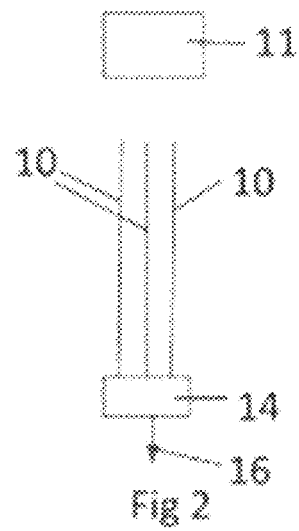
FIG. 2 is a diagram of another embodiment of the invention.

FIG. 2 shows another design of the invention. In this invention, wires 10 are extended high above the Earth. Near the top of the wire is an ion source 11. The ion source 11 produces positive ion around the wire 10. As in FIG. 1, the wire 10 is attached to a collector load 14. The collector load 14 is attached to the ground 16.

When positive ions are collected by the wire 10, electrons from the ground flow from the ground through the collector load 14 and up the wire to neutralize the positive ions. These electrons are drawn up with the force of the difference of the voltage at the top of the wire and the bottom of the wire.

This ion source 11 could be any efficient ion source that produces positive ions. The ion source 11 could be radiation, electron impact ionization, corona, plasma, discharge, a flame, cold cathode, thermionic emission, electrospray, strong external electric field emission, fast atom bombardment, electrospray ionization, atmospheric pressure chemical ionization, matrix-assisted laser desorption ionization, etc.

Figure 3:
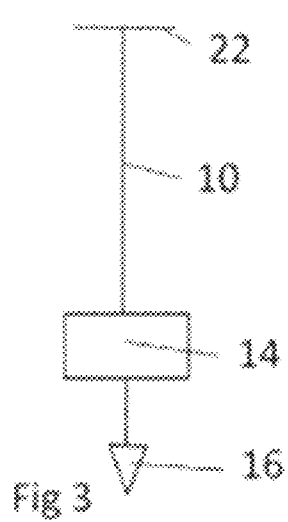
FIG. 3 is a diagram of an electrode at the top of the wire.
Figures 3A, 3B:
FIG. 3A is a diagram of another electrode for the top of the wire.
FIG. 3B is a diagram of another electrode for the top of the wire.
Figures 3C, 3D:
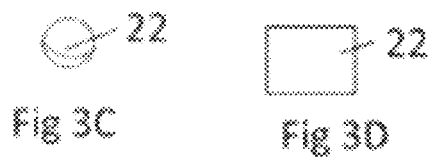
FIG. 3C is a diagram of another electrode for the top of the wire.
FIG. 3D is a diagram of another electrode for the top of the wire.

At the top of the wire 10, an electrode 22 can be placed, as shown in FIG. 3. FIG. 3 shows an electrode 22 that is a horizontal plate. The electrode 22 can be pointed, several points oriented in any direction, a plate oriented in any direction, several plates oriented in any direction, a metalized balloon, or several balloons. FIG. 3A shows an electrode 22 configuration with four points. FIG. 3B shows an electrode 22 configuration with one point. FIG. 3C shows an electrode 22 configured as a metalize sphere. FIG. 3D shows an electrode 22 as a plate. The top of the wire could take many shapes, including running the wire 10 up to the top of a tall building or pole and then draping the wire to another building or pole.

FIG. 3 E illustrates another example of another system for harvesting atmospheric electricity. In this system, the wire 22 has been replaced with a plasma filament 320 created by a laser 310. The use of a plasma filament for harvesting electric from the clouds is shown in U.S. Pat. No. 9,160,156 to Allen and Macheret.

Plasma filament 320 conducts electricity. Alen and Macheret say, "The plasma comprises of electrons and positive ions. The electrically conducting plasma filament is formed in the atmosphere by using an ultra short pulse laser (USPL). The USPL raises the conductivity of a tiny diameter channel (100 microns or less) for a very brief time. The propagation of high power ($1014$ $W/cm^2$) pulses from the USPL is accompanied by filamentation-self-channeling of femtosecond laser pulses in stable high-intensity light filaments with 100 microns diameters (so that the Kerr effect focusing balances the defocusing due to plasma formation). This filamentation keeps the beam virtually free of diffraction divergence.

Once initiated, plasma filaments cannot go on forever, and typically only propagate a kilometer or so before energy depletion and exhaustion. However, by using two coaxial USPL projection optics having different time-lensing parameters, a near and far filament could be initiated in a "daisy chain" to extend the total length of the conductive channel. The onset of filamentation in the far filament is time-lensed to coincide with the exhaustion range of the near filament. Additionally, using negative chirp, femtosecond laser pulses can propagate almost without loss until different frequency components of the wave packet, propagating at different speeds due to dispersion in air, come together at a certain desired location so that the laser intensity there exceeds the filamentation threshold, resulting in long ionized filaments created at a distance of up to several miles from the laser source. In other words, a negative chirp is used to essentially focus a beam of the laser at the desired distance to form the plasma filament there. Accordingly, this technique may be used to move the starting point and to extend the length of the plasma filament. The size, electrical conductivity, and lifetime of the plasma filaments are enhanced by an auxiliary act like an antenna to absorb the auxiliary radio-frequency (RF) electromagnetic waves or microwaves. The pulsed collection of electric charge and energy is repeated with an optimal (possibly very high) repetition rate of the pulsed laser and of the auxiliary RF waves or microwaves. The energy collected per one pulse should exceed the energy spent on creating and enhancing the plasma filaments so that the net energy collected is positive. The optimal pulse repetition rate (PRR) depends upon atmospheric conditions, which can vary widely over even short durations. As a general rule, one tries to tune the repetition rate to the plasma relaxation time (the ion-electron recombination time) so that the conductivity of the filament remains as high as is optimal given the atmospheric conditions at the time.

A feedback control system that varies the PRR, as well as the rest of the pulse-shaping parameters, may be employed to optimize the net power production of the system." For more information on the plasma filament, please see U.S. Pat. No. 9,160,156 to Allen and Macheret. For more information regarding pulse shaping and tailoring, which is the central theme of the field called "quantum control," please see A. Assion, T. Baumert, M. Bergt, T. Brixner, B. Kiefer, V. Seyfried, M. Strehle, G. Gerber (30 October). "Control of Chemical Reactions by Feedback-Optimized Phase-Shaped Femtosecond Laser Pulses." Science 282 (5390): 919-922. doi:10.1126/science.282.5390.919. PMID 9794756.

Figure 3E:
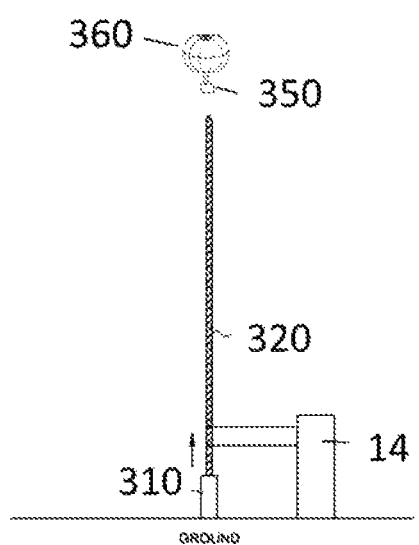
FIG. 3E is another embodiment of the invention using a laser on the ground.

With the average electron density and channel diameter, at 160 ml pulse is sufficient to generate a 1 km long channel. Filamentation has been produced and detected at altitudes as high as 13-20 km. However, a 1 km channel would be at about 100,000 volts. Near the top of the plasma filament 320, an ion source 350 would be placed. The ion source 350 could be suspended by a balloon 360, as shown in FIG. 3E. Just above laser 310, collector load 14 collects the electric flow along plasma filament 320.

Figure 3F:
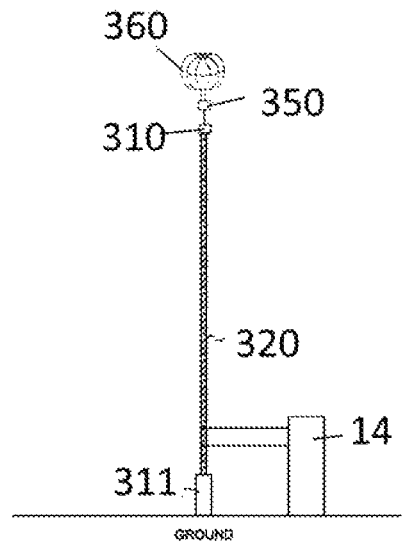
FIG. 3F is another embodiment of the invention using a laser above the Earth.

FIG. 3F shows another embodiment. It is similar to FIG. 3E in that a plasma filament 320 is used. In this embodiment, balloon 360 or aircraft carries the laser 310 to a high altitude. The laser 310 is activated and is beamed at a target 311 on the Earth. The plasma filament 320 extends from the balloon 360 to the target 311. At target 311 is a collector load 14 configured to collect electricity flowing along the plasma filament 320. The ion source 350 is carried aloft by the balloon 360 and suspended near the top of the plasma filament 320, as shown in FIG. 3F.

Figure 4:
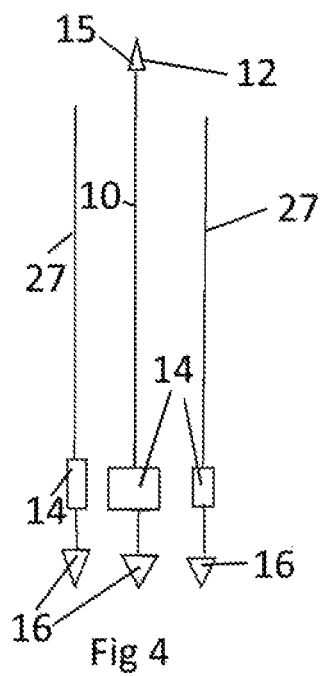
FIG. 4 is another embodiment of the invention that combines the embodiment of FIGS. 1 and 2.
Figure 5:
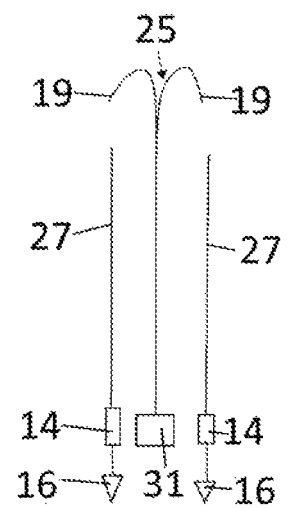
FIG. 5 is another embodiment of the invention that combines the embodiment of FIGS. 1 and 2 with a design different from FIG. 4.

The embodiments of FIGS. 1, 2, and 3 can be combined. If the ion source 11 of figure one produces electrons of sufficient force that they will collide with molecules in the air and produce ion pairs. The positive ion could be collected by a wire 27 and electrode 22—FIGS. 4 and 5 show this design. In FIG. 4, a wire 10 that extends high above the Earth. Attach to the end above the Earth of the wire 10 is a source 12 emitting electron. This source 12 could produce electrons or negative ions by radioactive, thermionic emissions, photoemission, etc. In the preferred embodiment, the source 12 emitting electron is a radioactive source 15 giving off beta particles. The wires 27 are attached to a collector load 14. The collector load 14 is attached to the ground 16. When the source 12 emitting electron produces an electron, it becomes more positive, drawing up an electron from the ground. This electron is drawn up with the force of the difference of the voltage at the top of the wire and the bottom of the wire. If the electron given off by the source 12 emitting electrons radiates electron with sufficient energy, the electrons will ionize the air molecules. The positive ions created by these collisions are collected by the wires 27 surrounding wire 10. Electrons from the ground 16 flow from the ground through collector load 14 and up the wire to neutralize the positive ions.

FIG. 5 shows the ion source 25 also gives off ions of sufficient energy to create ion pairs. In FIG. 5, the ion source 25 has corona discharge electrodes 19. The corona discharge is created by power source 31. The corona discharges electrodes 19 gives off ions of sufficient energy to create ion pairs. The positive ions created are collected by the wires 27. Electrons from the ground 16 flow from the ground 16 through collector load 14 and up the wire 27 to neutralize the positive ions.

Figure 6:
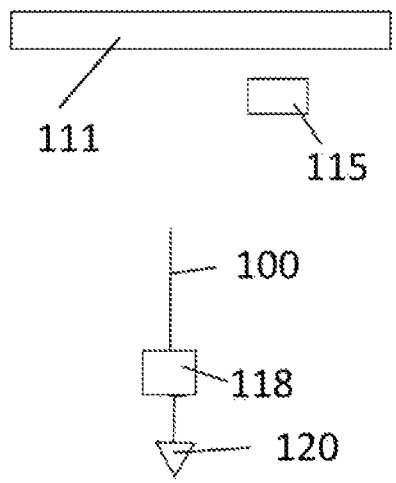
FIG. 6 is a diagram of another embodiment of the invention that uses the static field of an electret.
Figure 7:
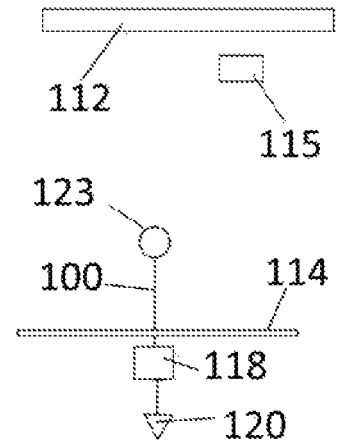
FIG. 7 is a diagram of another embodiment of the invention that uses the static field of a charged plate.

FIGS. 6 and 7 show other embodiments of the invention. This embodiment is similar to the embodiment of FIG. 2, except the static field of the Earth is not used. In its place is a static field that is created by an electret or charged plates. In the preferred design of this embodiment, a wire 100 is extended, as shown in FIG. 6. An electret 111 in FIG. 6 or a charged plate 112 in FIG. 7 is suspended above the wire 100. The wire 100 may extend from a plate 114, as shown in FIG. 7. Suspended near the tip of the wire 100 is an ion source 115. The ion source 115 produces ions that are of the same charge as the electret 111 or the charged plate 112. As in the previous embodiment, the ion source 115 could be radiation, electron impact ionization, corona discharge, flame, cold cathode, thermionic emission, electrospray, strong external electric field emission, fast atom bombardment, electrospray ionization, atmospheric pressure chemical ionization, matrix-assisted laser desorption ionization, etc. The wires 100 are attached to a collector load 118. The collector load 118 is attached to the ground 120. At the top of the wire 100, an electrode 123 can be placed, as shown in FIG. 7. The electrode 123 can be pointed, several points oriented in any direction, a plate oriented in any direction, several plates oriented in any direction, a metalized balloon, several balloons, etc. In FIG. 7, the electrode 123 is a metalized sphere.

Figure 8:
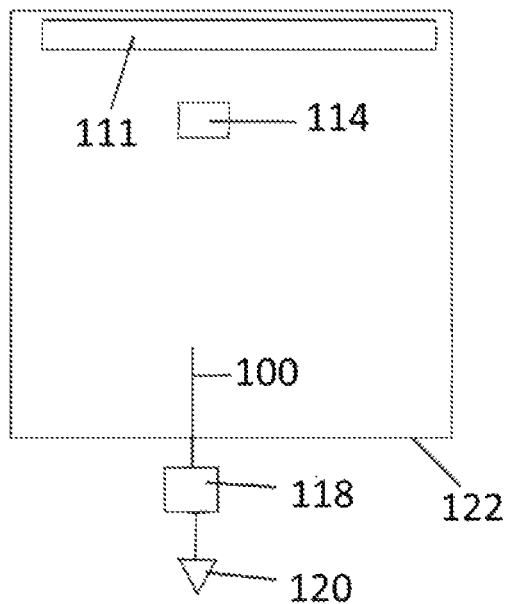
FIG. 8 is a diagram of another embodiment of the invention that uses the static field of an electret and is enclosed in a box.
Figure 9:
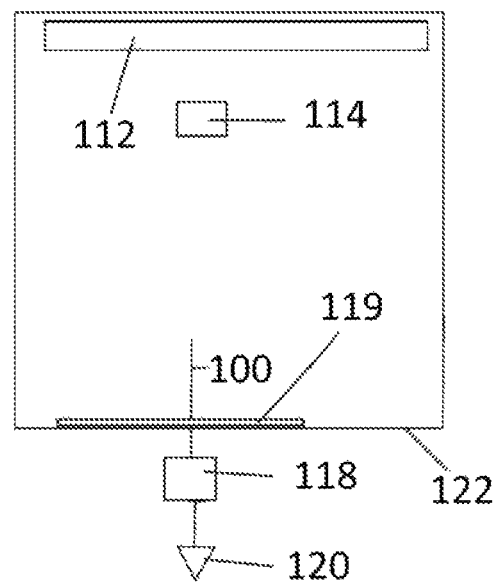
FIG. 9 is a diagram of another embodiment of the invention that uses the static field of a charged plate and is enclosed in a box.

In FIGS. 8, 9, the entire FIG. 6 is enclosed in a box 122. In the preferred design of this embodiment, a wire 100 extends up from the bottom of the box 122. An electret 111 in FIG. 8 or a charged plate 112 in FIG. 9 is suspended above the wire from the top of the box 122. The wire 100 may extend from a plate 119 at the bottom of the box 122, as shown in FIG. 9. Suspended near the tip of the wire 100 is an ion source 114. The ion source 114 produces ions that are of the same charge as the electret 111 or the charged plate 112. As in the previous embodiments, the ion source 114 could be radiation, flame, electron impact ionization, corona discharge, cold cathode, thermionic emission, electrospray, strong external electric field emission, fast atom bombardment, electrospray ionization, atmospheric pressure chemical ionization, matrix-assisted laser desorption ionization, etc. The wires 100 extends out of the bottom of the box to collector load 118. The collector load 118 is attached to the ground 120. The box can be filled with different gasses, liquids, or solids, or the box could contain an empty vacuum. The substance filling the box must be able to be penetrated by an electrostatic field.

Figure 10:
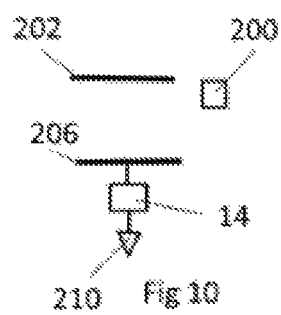
FIG. 10 is a diagram of another embodiment of the invention in which a static field form by an electret accelerates ions towards a collector.
Figure 11:
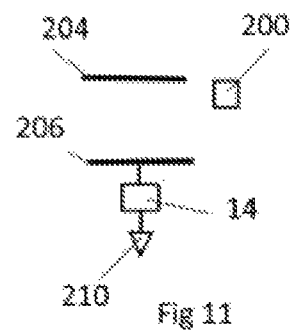
FIG. 11 is a diagram of another embodiment of the invention in which a static field form by a charged plate accelerates ions towards a collector.

FIGS. 10 and 11 are another embodiment of the invention—FIGS. 10 and 11 show an ion source 200. In FIG. 10, the ion is shown to give off positive ions. However, it could also give off negative ions. In FIG. 11, the ion is shown to give off negative ions. However, it could also give off positive ions. The ion source 200 could be radiation, electron impact ionization, corona discharge, flame, cold cathode, thermionic emission, electrospray, strong external electric field emission, fast atom bombardment, electrospray ionization, atmospheric pressure chemical ionization, matrix-assisted laser desorption ionization, etc. FIG. 10 also shows an electret 202, and FIG. 11 shows a charged plate 204. The static field created by the electret 202 or the charged plate 204 is position such that it will accelerate the ions from the ion source 200.

The static field accelerates the electrons towards an electrode 206. The electrode 206 could be a plate, a screen, or a set of wires. FIGS. 10 and 11 the area between electret 202 in FIG. 10 and charged plate 204 in FIG. 11 and the electrode 206 could be filled with air, a gas, a vacuum, a solid, or a liquid. The substance that fills the area between the electret 202 in FIG. 10 and charged plate 204 in FIG. 11, and the electrode 206 must be able to be penetrated by an electrostatic field. The electrode 206 is attached to a collector load 14, which is attached to a ground 210.

Figure 12:
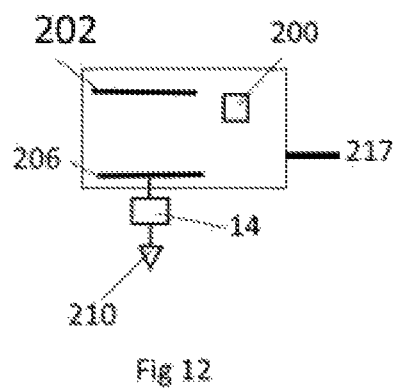
FIG. 12 is a diagram of another embodiment of the invention in which a static field form by an electret accelerates ions towards a collector enclosed in a box.
Figure 13:
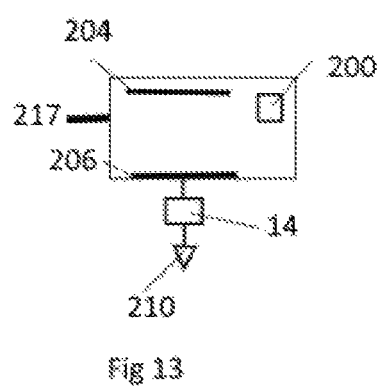
FIG. 13 is a diagram of another embodiment of the invention in which a static field form by a charged plate accelerates ions towards a collector enclosed in a box.

Another configuration of the embodiment shown in FIGS. 10 and 11 are shown in FIGS. 12 and 13. In this configuration, a charge plate 204 or the electret 202 and electrode 206 is placed in a box. The box can be filled with different gasses, liquids, or solids, or the box could contain an empty vacuum. The substance filling the box must be able to be penetrated by an electrostatic field. The electrode 206 is attached to a collector load 14, which is attached to a ground 210. The ion source 200 is placed near the electret 202 or charged plate 204, and the ion source gives off ions of the same charge as the electret 202 or the charge plate 204.

Figure 14:
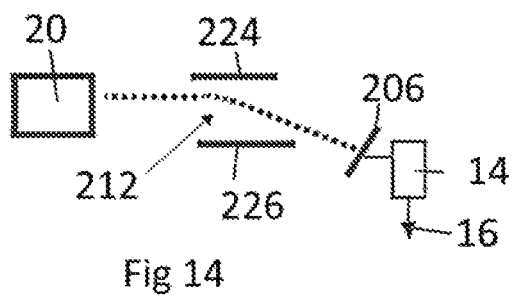
FIG. 14 is a diagram of another embodiment of the invention in which ions are accelerated by a static field formed by two charged electrets.
Figure 16:
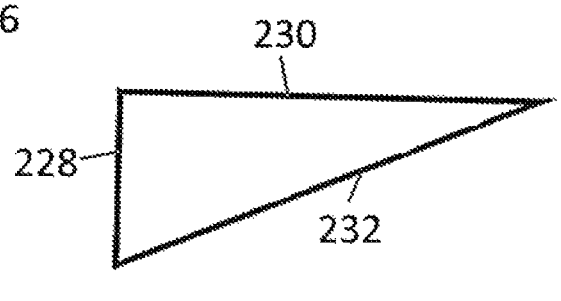
FIG. 16 is a vector diagram of the forces on the ions of FIGS. 14 and 15.
Figure 15:
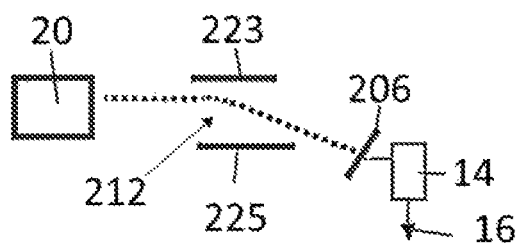
FIG. 15 is a diagram of another embodiment of the invention in which ions are accelerated by a static field formed by two charged plates.

FIGS. 14 and 15 show an ion source 20. The ion source 20 accelerated the ions to a velocity. The ions move forward at the given velocity into an electric field 212 formed by two charged plates 223 and 225 shown in FIG. 15, or electrets 224 and 226 shown in FIG. 14. The ions are accelerated downward or upward according to the charge upon the plates 223 and 225 or electrets 224 and 226. An electrode 206 collects the deflected ions. The charge on electrode 206 runs through collector load 14 to ground 16. The velocity of the ions will be the forward velocity plus the downward or upward velocity created by the electric field 212 by the two plates 223 and 225 or electrets 224 and 226. The addition of these two velocities is shown in the vector diagram of FIG. 16. FIG. 16 shows the upward velocity 228 and the forward velocity 230. These velocities equal the velocity 232.

Figure 17:
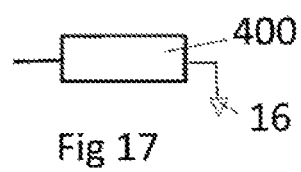
FIG. 17 is a diagram of one embodiment of the collector load with an electrostatic motor.
Figure 17A:
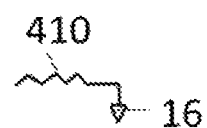
FIG. 17A is a diagram of one embodiment of the collector load with a heater.
Figure 17B:
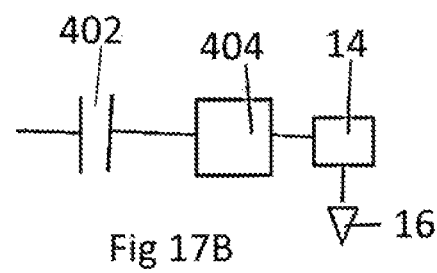
FIG. 17B is a diagram of one embodiment of the collector load with a capacitor and switch.
Figure 17C:
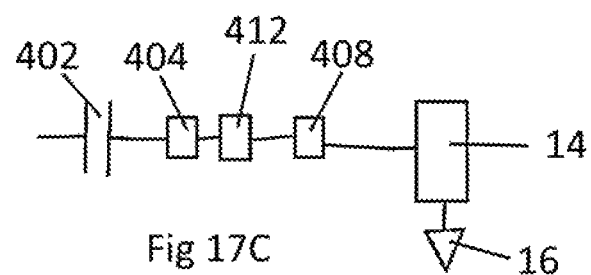
FIG. 17C is a diagram of one embodiment of the collector load with an inverter and transformer.

The collector load 14 and 118 could be just a load such as an electrostatic motor 400 or a heater 410, as shown in 17 and 17A. The collector load could also be a capacitor 402 that collects and stores the charge and a switch 404 that open when the capacitor hits a specific voltage, as shown in 17B. When the electric in the circuit hits a certain voltage, the switch 404 will open and allow the electricity to flow to the load 14. The switch can be created by many circuits known in the art. These include high voltage relays, spark gaps, thyratrons, and all kinds of high voltage switching tubes. The collector could also contain circuits to lower the voltage, as shown in FIG. 17C. This circuit to lower voltage could contain a transformer 412. The collector load could also contain an inverter 408 to change the voltage from DC to AC, as shown in 17C.

Figure 18:
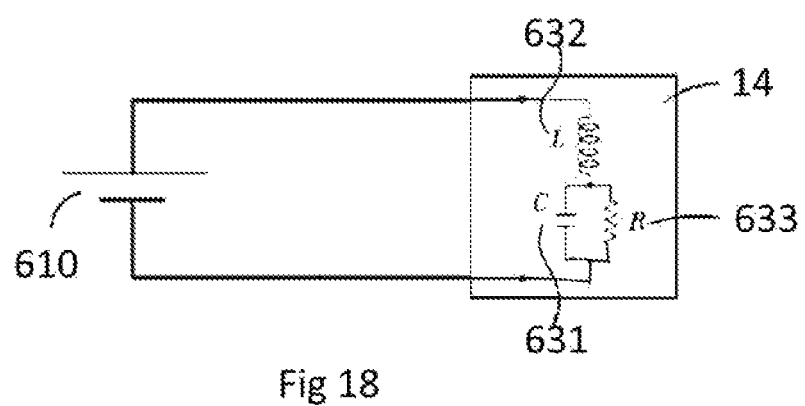
FIG. 18 shows a circuit configured to collect electricity flowing along a plasma filament 320.

FIG. 18 shows a circuit configured to collect electricity flowing along a plasma filament 320. This circuit was described in U.S. Pat. No. 9,160,156 to Allen and Macheret. The circuit may be a charge collection circuit characterized by capacitance 631, inductance 632, and resistance 633. The electricity may be collected by charging a capacitor associated with capacitance 631. Battery 610 represents the naturally existing voltage created by the vertical voltage gradient between the ionosphere and the Earth. The plasma filament 320 can, for the purpose of analysis and optimization of the charge collection process, be viewed as electromagnetic transmission lines characterized by their effective capacitance, inductance, and resistance per unit length.

I claim:

1. A generator system comprising:
   a) an ion source placed by a person to produce ions;
   b) a charge collection circuit containing a load and a collector of ions, the charge collection circuit including a means for storing a charge from the ions, connected to the collector of ions and the load, and a means for discharging the means for storing the charge; and
   c) a static field that accelerates the ions from the ion source and increases an energy of the ions, the static field including a first electret and a second electret, the second electret having an opposite charge to the first electret and placed in position to create the static field between the first electret and the second electret, the ion source accelerates the ions to a given velocity, wherein the ions move through the static field created by the first electret and the second electret.

2. A generator system comprising:
   a) a first collector that collects ions of a given charge, either positive or negative;
   b) an ion source configured to create ions of the given charge within the first collector and cause ions of an opposite charge to be emitted from the first collector;
   c) a first charge collection circuit connected to the first collector; and
   d) a static field positioned to accelerate ions of the opposite charge created by the ion source and to cause electricity to flow along the first collector to eliminate ions of the given charge created by the ion source in the first collector and cause electricity to flow into or out of the first charge collection circuit.

3. A generator system as in claim 2 wherein:
   a) the first collector is between a ground and a sky of Earth;
   b) the static field is the static field that surrounds Earth; and
   c) the ion source is placed near a top of the first collector and creates ions within the first collector.

4. The generator system as in claim 3 further comprising:
   a) the first collector is a plasma filament created by a laser that is carried aloft by an aircraft.

5. The generator system as in claim 2 further comprising:
   a) a second collector configured to collect ions of a given charge, either positive or negative.

6. A generator system as in claim 2 wherein:
   a) the ion source is chosen from a group of ion sources consisting of substances that give off ions through radioactivity, photo emissive effect, strong external electric field emission, or thermionic effect.

7. The generator system as in claim 2 wherein;
   a) the ions of the opposite charge that escape the first collector are accelerated by the ion source or the static field to an energy sufficient to create ions of the given charge; and
   b) said static field is positioned to accelerate ions of the given charge that are outside the first collector towards the first collector.

8. The generator system as in claim 2 wherein:
   a) the static field is created by a first charged plate and said first charged plate is positioned to cause electricity to flow along the first collector to eliminate the ions of the given charge in the first collector.

9. The generator system as in claim 2 wherein:
   a) the static field is created by a first electret and said first electret is positioned to cause electricity to flow along the first collector to neutralize the ions of the given charge in the first collector.

10. The generator system as in claim 2 further comprising:
    a) a box that encloses the ion source, the first collector, and the static field.

11. The generator system as in claim 10 wherein:
    a) the box is filled with a gas, a solid, or a liquid, or an interior of the box is maintained at a pressure less than atmospheric pressure or in a vacuum.

12. A generator system comprising:
    a) a first collector configured to collect ions of a given charge, either positive or negative;
    b) an ion source placed by a user not within the first collector configured to create ions of the given charge in a vicinity of the first collector;
    c) a first charge collection circuit connected to the first collector and configured to cause and collect electricity flowing along the first collector; and
    d) a static field positioned to accelerate ions of the given charge created by the ion source towards the first collector and is positioned to cause electricity to flow along the first collector to neutralize the ions of the given charge that make contact with the first collector.

13. The generator system as in claim 12 wherein:
    a) the static field is created by a first charged plate and the first charged plate is positioned to accelerate ions of the given charge created by the ion source towards the first collector and cause electricity to flow along the first collector to neutralize the ions of the given charge that make contact with the first collector.

14. The generator system as in claim 12 wherein:
    a) the static field is created by a first electret and the first electret is positioned to accelerate ions of a given charge created by the ion source towards the first collector and cause electricity to flow along the first collector to neutralize the ions of the given charge that make contact with the first collector.

15. The generator system as in claim 12 further comprising:
    a) a box that encloses the first collector, the ion source, and the static field.

16. A generator system as in claim 15 wherein:
    a) the box is filled with a gas, a solid, or a liquid, or an interior of the box is maintained at a pressure less than atmospheric pressure or in a vacuum.

17. A generator system as in claim 12 wherein:
    a) the first collector between a ground and a sky of Earth;
    b) the static field is the static field that surrounds Earth; and
    c) the ion source is placed near a top of the first collector.

18. The generator system as in claim 17 further comprising:
    a) an aircraft to carry aloft the ion source.

19. The generator system as in claim 12 further comprising:
    a) a second collector configured to collect ions of a given charge, either positive or negative.

20. A generator system as in claim 12 wherein:
    a) the ion source is chosen from a group of ion sources that produce ions by corona discharge, radioactivity, creating a plasma, charging a vapor, flame, electron impact ionization, electrospray ionization, and atmospheric pressure chemical ionization.

21. The generator system as in claim 12 wherein;
    a) the ions that are created by the ion source are accelerated by the ion source or the static field to an energy sufficient to create ions of the given charge; and b) said static field is positioned to accelerate ions of the given charge that are outside the first collector towards the first collector.

22. The generator system as in claim 12 wherein the static field includes a first electret and a second electret,
   a) the second electret of an opposite charge to the first electret and placed in position to create the static field between the first electret and the second electret to accelerate ions created by the ion source toward the first collector, and
   b) the ion source accelerates the ions to a given velocity, wherein the ions move through the static field created by the first electret and the second electret.

23. The generator system as in claim 12 wherein the static field includes a first charged plate and a second charged plate,
   a) the second charged plate of an opposite charge to the first charged plate and placed in position to create the static field between first charged plate and the second charged plate to accelerate ions created by the ion source toward the first collector, and
   b) the ion source accelerates the ions to a given velocity, wherein the ions move through the static field created by the first charged plate and the second charged plate.

24. The generator system as in claim 15 wherein the static field includes a first electret and a second electret,
   a) the first electret and the second electret disposed within the box, the second electret of an opposite charge to the first electret and placed in position to create the static field between the first electret and the second electret to accelerate ions created by the ion source toward the first collector; and
   b) the ion source accelerates the ions to a given velocity, wherein the ions enter into the static field created by the first electret and the second electret.

25. The generator system as in claim 15 wherein the static field includes a first charged plate and a second charged plate,
   a) first charged plate and the second charged plate disposed within the box, the second charged plate of an opposite charge to the first charged plate and placed in position to create the static field between the first charged plate and the second charged plate to accelerate ions created by the ion source toward the first collector; and
   b) the ion source accelerates the ions to a given velocity, wherein the ions enter into the static field created by the first charged plate and the second charged plate.

\* \* \* \* \*